US012754355B2

(12) United States Patent
Yonetani

(10) Patent No.: US 12,754,355 B2
(45) Date of Patent: Oct. 6, 2026

(54) DIFFRACTIVE OPTICAL ELEMENT AND METHOD OF MANUFACTURING DIFFRACTIVE OPTICAL ELEMENT

(71) Applicant: CANON KABUSHIKI KAISHA, Tokyo (JP)

(72) Inventor: Kouichi Yonetani, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 176 days.

(21) Appl. No.: 18/421,622

(22) Filed: Jan. 24, 2024

(65) Prior Publication Data

US 2024/0264341 A1 Aug. 8, 2024

(30) Foreign Application Priority Data

Jan. 26, 2023 (JP) ................................ 2023-009972

(51) Int. Cl.
*G02B 5/18* (2006.01)

(52) U.S. Cl.
CPC ......... *G02B 5/1814* (2013.01); *G02B 5/1852* (2013.01); *G02B 5/1857* (2013.01)

(58) Field of Classification Search
None
See application file for complete search history.

(56) References Cited

U.S. PATENT DOCUMENTS 6,157,488 A * 12/2000 Ishii ..................... G02B 5/1866 359/569
6,262,846 B1 * 7/2001 Nakai .................. G02B 5/1895 359/566
6,473,232 B2 * 10/2002 Ogawa ............... G02B 27/4211 359/569
2001/0015848 A1 * 8/2001 Nakai .................. G02B 5/1866 359/576
2003/0234982 A1 12/2003 Shimmo et al.
2009/0141354 A1 * 6/2009 Kobayashi ........... G02B 5/1852 359/571
2010/0246008 A1 * 9/2010 Murata ................ G02B 5/1814 264/1.7
2018/0239069 A1 8/2018 Iwata
2022/0128817 A1 4/2022 Singh et al.

FOREIGN PATENT DOCUMENTS

| | | | |
|---|---|---|---|
| JP | 2000199062 | A | 7/2000 |
| JP | 2001337214 | A | 12/2001 |
| JP | 2004013081 | A | 1/2004 |
| JP | 2009516225 | A | 4/2009 |
| JP | 2009192754 | A | 8/2009 |
| JP | 2011257689 | A | 12/2011 |
| WO | 2010/032347 | A1 | 3/2010 |

* cited by examiner

*Primary Examiner* — Robert E. Tallman
(74) *Attorney, Agent, or Firm* — Canon U.S.A., Inc. IP Division

(57) ABSTRACT

A diffractive optical element includes a first resin portion having a first diffraction grating and made of a first resin material, a second resin portion having a second diffraction grating formed to cover the first diffraction grating and made of a second resin material, and a transparent inorganic film formed on an optically effective surface, which is an interface between the first diffraction grating and the second diffraction grating, wherein a thickness of the transparent inorganic film at a grating tip of the first diffraction grating is thicker than a thickness of the transparent inorganic film at a grating surface other than the grating tip of the first diffraction grating.

13 Claims, 13 Drawing Sheets

DIFFRACTIVE OPTICAL ELEMENT AND METHOD OF MANUFACTURING DIFFRACTIVE OPTICAL ELEMENT

BACKGROUND

Field

The present disclosure generally relates to a diffractive optical element and a method of manufacturing a diffractive optical element.

Description of the Related Art

Conventionally, there has been known a method of reducing chromatic aberration of a lens system by providing a diffractive optical element having diffraction function in a part of the optical system. In addition to correcting chromatic aberration, it is known that the diffractive optical element has an aspherical effect by appropriately changing the grating pitch of its periodic structure. In the diffractive optical element used for a lens of an optical system, it is known that high diffraction efficiency can be obtained in a wide wavelength band by closely arranging two diffraction gratings and appropriately setting the material constituting each diffraction grating and the grating height of each diffraction grating.

International Publication No. WO 2010/032347 discloses a diffractive optical element in which diffraction efficiency is improved by closely forming, on a diffraction grating made of an injection molding material, a diffraction grating made of another resin material. Japanese Patent Application Laid-Open No. 2009-192754 discloses a diffractive optical element in which a transparent inorganic film is disposed on the surface of a diffractive optical element made of an injection molding material and a diffraction grating made of another resin material is closely formed thereon.

However, in the diffractive optical elements using the resin materials described in International Publication No. WO2010/032347 and Japanese Patent Application Laid-Open No. 2009-192754, it was difficult to maintain high optical performance while reducing or preventing aging deterioration.

SUMMARY

It is an object of the present disclosure to provide a diffractive optical element and a method of manufacturing a diffractive optical element in which high optical performance can be maintained while reducing aging degradation in the diffractive optical element in which a resin material is used.

According to some embodiments, a diffractive optical element can include a first resin portion having a first diffraction grating and made of a first resin material, a second resin portion having a second diffraction grating formed to cover the first diffraction grating and made of a second resin material, and a transparent inorganic film formed on an optically effective surface, which is an interface between the first diffraction grating and the second diffraction grating, wherein a thickness of the transparent inorganic film at a grating tip of the first diffraction grating is thicker than a thickness of the transparent inorganic film at a grating surface other than the grating tip of the first diffraction grating.

According to some embodiments, a method of manufacturing a diffractive optical element can include injection molding a thermoplastic resin to form a first resin portion having a first diffraction grating and made of the thermoplastic resin, forming a transparent inorganic film on the first diffraction grating, and forming a photocurable resin on the transparent inorganic film to form a second resin portion having a second diffraction grating and made of the photocurable resin, wherein forming the transparent inorganic film forms the transparent inorganic film such that a thickness of the transparent inorganic film at a grating tip of the first diffraction grating is thicker than a thickness of the transparent inorganic film at a grating surface other than the grating tip of the first diffraction grating.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings.

First Embodiment

A diffractive optical element and a method of manufacturing a diffractive optical element according to a first embodiment of the present invention will be described with reference to FIGS. 1A to 4B.

Figure 1A:
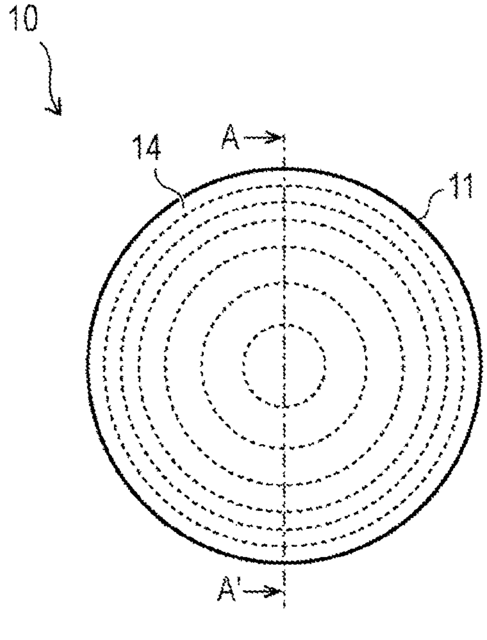
FIGS. 1A and 1B are schematic diagrams illustrating a diffractive optical element according to a first embodiment of the present disclosure.
Figure 1B:
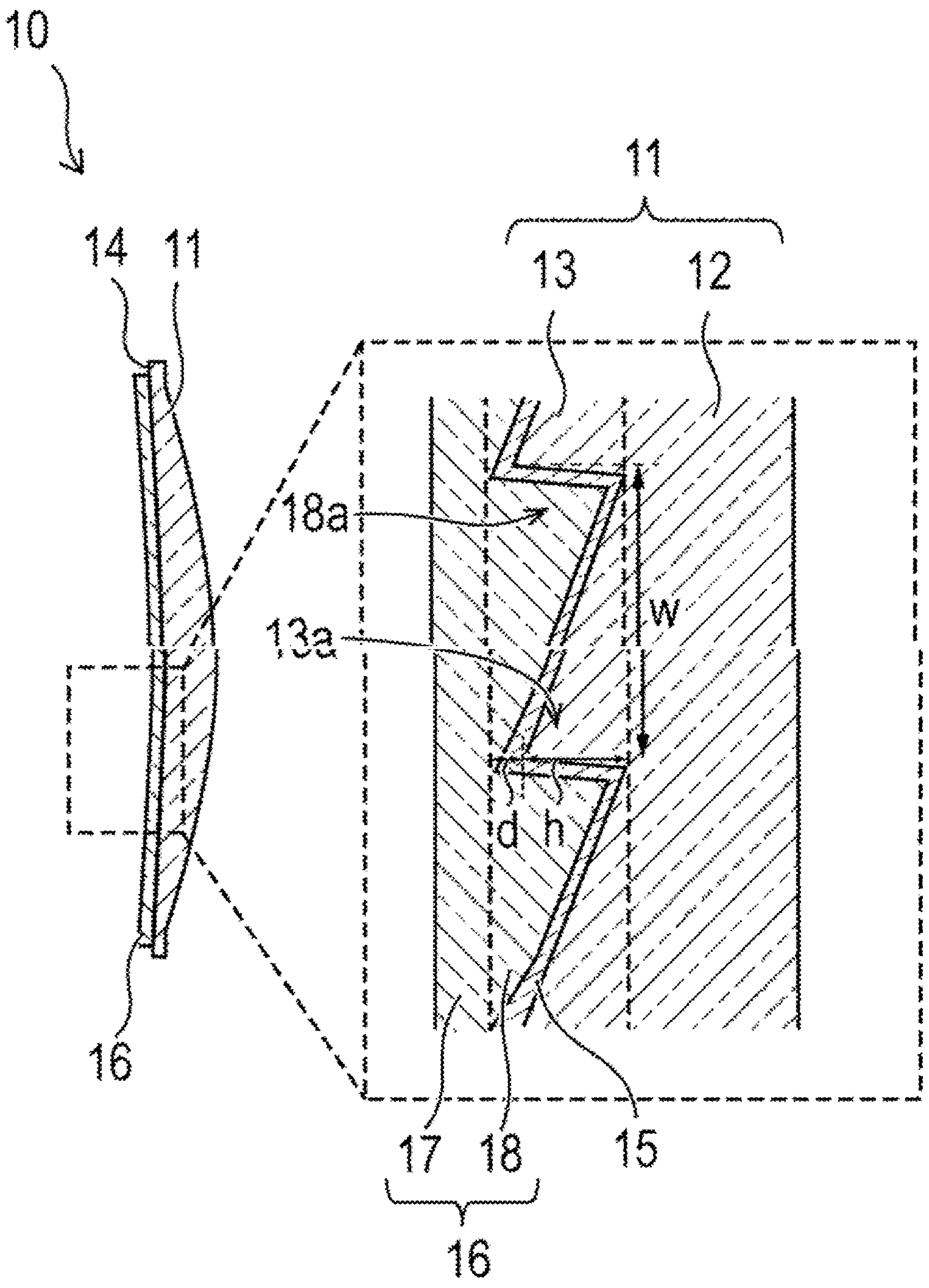

First, a configuration of the diffractive optical element according to the present embodiment will be described with reference to FIGS. 1A and 1B. FIG. 1A is a plan view illustrating the diffractive optical element 10 according to the present embodiment. FIG. 1B is a cross sectional view illustrating the diffractive optical element 10 according to the present embodiment, which illustrates a cross section along the line A-A' illustrated in FIG. 1A on the left side and illustrates an enlarged part surrounded by a rectangle of a broken line in the cross section on the right side.

As illustrated in FIGS. 1A and 1B, the diffractive optical element 10 according to the present embodiment includes a first resin portion 11, a transparent inorganic film 15, and a second resin portion 16. The diffractive optical element 10 according to the present embodiment is used in optical equipment such as a digital camera, a video camera, binoculars, a head mounted display, and the like, although not particularly limited.

The first resin portion 11 has a grating base part 12, a grating part 13, and an outer peripheral part 14. The grating base part 12, the grating part 13, and the outer peripheral part 14 are integrally formed. The outer peripheral part 14 is formed on the outer periphery of the grating base part 12 and the grating part 13.

The shape of the grating base part 12 is not particularly limited, but may be a convex spherical shape, a concave spherical shape, an aspherical shape, or a planar shape. The grating base part 12 may be axisymmetric or non-axisymmetric with respect to the optical axis of the diffractive optical element 10. The grating part 13 is formed on the grating base part 12 so as to have a first diffraction grating 13*a* arranged concentrically with respect to the optical axis of the diffractive optical element 10. The first diffraction grating 13*a* is formed of convex parts each having an inner wall surface and an outer wall surface arranged concentrically with respect to the optical axis of the diffractive optical element 10. The first diffraction grating 13*a* is formed so that grating surfaces, which are slopes, and wall surfaces are continuously repeated from the element center through which the optical axis passes to the outer periphery.

A first resin material constituting the first resin portion 11 is, for example, a thermoplastic resin, although it is not particularly limited as long as the first resin material is a transparent resin having transparency to light such as visible light toward which the diffractive optical element 10 is targeted. The first resin portion 11 is formed by, for example, injection molding of a thermoplastic resin. Note that, in the specification, "transparent" means that the transmittance of light in the wavelength range of 420 nm to 700 nm is 10% or more.

The transparent inorganic film 15 is formed on the grating part 13 of the first resin portion 11 and is formed on the first diffraction grating 13*a*. The transparent inorganic film 15 is a thin film made of a transparent inorganic material having transmittance to light such as visible light toward which the diffractive optical element 10 is targeted. The transparent inorganic film 15 is formed to cover the grating surfaces along the grating surfaces of the first diffraction grating 13*a* in the grating part 13. The transparent inorganic film 15 is formed to cover the wall surfaces along the wall surfaces of the first diffraction grating 13*a* in the grating part 13. The thickness of the transparent inorganic film 15 at the grating tip of the first diffraction grating 13*a* is thicker than the thickness of the transparent inorganic film 15 at the grating surface other than the grating tip of the first diffraction grating 13*a*. Note that the grating tip of the first diffraction grating 13*a* is the vertex of the convex part constituting the first diffraction grating 13*a*. Note also that the thickness of the transparent inorganic film 15 at the grating tip of the first diffraction grating 13*a* may be an average thickness in the diffractive optical element 10. Note also that the thickness of the transparent inorganic film 15 at the grating surface other than the grating tip may also be an average thickness in the diffractive optical element 10. When the grating width W is more than 0.04 mm, the grating tip refers to a region up to 0.02 mm from the grating tip toward the adjacent grating wall surface. When the grating width W is 0.04 mm or less, the grating tip refers to a region up to W/2 from the grating tip toward the adjacent grating wall surface.

The second resin portion 16 is formed on the transparent inorganic film 15. The second resin portion 16 has a grating base part 17 and a grating part 18. The grating base part 17 and the grating part 18 are integrally formed. The grating part 18 is formed on the transparent inorganic film 15 so as to close to the transparent inorganic film 15 thus to fill the recessed part between the convex parts of the first diffraction grating 13*a*. Thus, the grating part 18 has a second diffraction grating 18*a* formed so as to cover the first diffraction grating 13*a* adjacent to the first diffraction grating 13*a* via the transparent inorganic film 15. That is, the transparent inorganic film 15 is formed on an optically effective surface that is an interface between the first diffraction grating 13*a* and the second diffraction grating 18*a*. A second resin material constituting the second resin portion 16 is not particularly limited as long as the second resin material is a transparent resin having transparency to light such as visible light toward which the diffractive optical element 10 is targeted, but is preferably a photocurable resin or a thermosetting resin from the viewpoint of ease of manufacture.

Thus, the diffractive optical element 10 according to the present embodiment is constituted.

As described in International Publication No. WO 2010/032347 mentioned above, as a technique to configure an optical system with low cost, it is known that an optical element such as a lens with a diffraction grating formed on the surface is obtained by integral molding by using a mold with a diffraction surface when molding with an injection molding material. However, it is known that, when another resin material is applied to the optical layer made of the injection molding material, a phenomenon occurs, in which organic components contained in the resin material migrate into the injection molding material to permeate and dissolve the injection molding material.

Therefore, Japanese Patent Application Laid-Open No. 2009-192754 discloses a technique for obtaining a diffractive optical element in which a transparent inorganic film is formed uniformly thin on the surface of a diffractive optical element made of an injection molding material and a diffraction grating made of another resin material is tightly formed thereon. However, in the diffraction grating made of the injection molding material, the material density becomes lower toward the grating tip, and permeation and dissolution of another resin material is more likely to occur. Therefore, when the transparent inorganic film is formed uniformly thin, a phenomenon may occur, in which the organic components contained in another resin material transfers to the grating tip of the diffraction grating made of the injection molding material as time passes, and the permeation and dissolution occurs, which deteriorates the diffraction efficiency after several years, for example. On the other hand, when the transparent inorganic film is formed uniformly thick, the initial optical performance of the diffraction grating is affected, and it may be difficult to obtain high diffraction efficiency in a wide wavelength range. In addition, when another resin material is formed on the diffraction grating made of a resin material via the transparent inorganic film, not limited to the injection molding material, the same inconvenience of deteriorating diffraction efficiency or affecting the initial optical performance due to the permeation and dissolution occurs.

In contrast, in the diffractive optical element 10 according to the present embodiment, the transparent inorganic film 15 is formed between the first resin portion 11 having the first diffraction grating 13*a* and the second resin portion 16 having the second diffraction grating 18*a*. That is, the transparent inorganic film 15 is formed on the optically effective surface which is the interface between the first diffraction grating 13*a* and the second diffraction grating 18*a*. Furthermore, in the diffractive optical element 10 according to the present embodiment, the thickness of the transparent inorganic film 15 at the grating tip of the first diffraction grating 13*a* is greater than the thickness of the transparent inorganic film 15 at the grating surface other than the grating tip of the first diffraction grating 13*a*. Thus, in the diffractive optical element 10 according to the present embodiment, the deterioration of the diffraction efficiency due to the permeation and dissolution of the resin material at the grating tip of the first diffraction grating 13*a* can be reduced or prevented while the influence of the transparent inorganic film 15 on the initial optical performance is suppressed to a small degree. Therefore, in the close-contact type diffractive optical element 10 using a resin material such as an injection molding material, high diffraction efficiency can be obtained in the entire visible region, and the aging deterioration due to the permeation and dissolution of the resin material between the first resin portion 11 and the second resin portion 16 can be reduced or prevented.

Figure 2A:
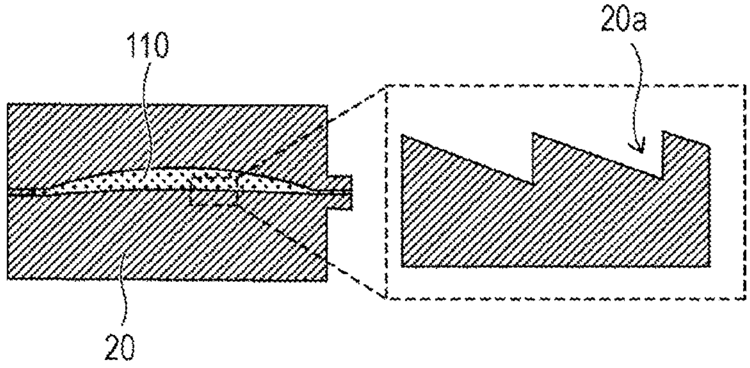
FIGS. 2A and 2B are schematic diagrams illustrating a method of manufacturing a diffractive optical element according to the first embodiment.
Figure 2B:
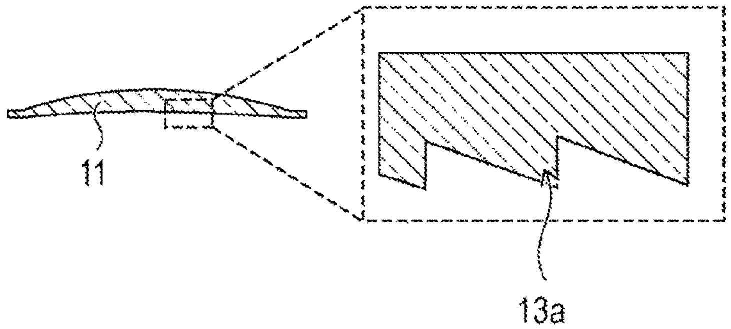
Figure 3A:
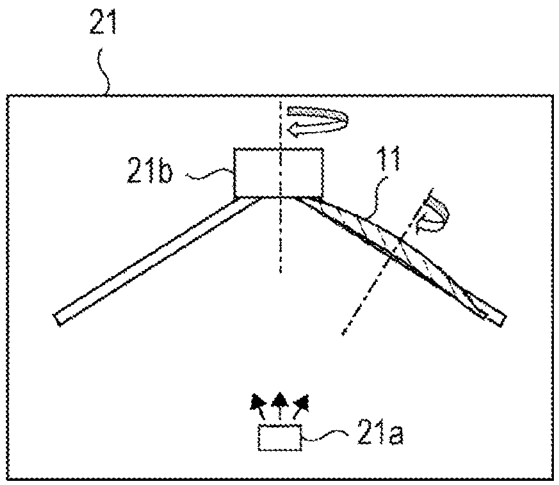
FIGS. 3A, 3B and 3C are schematic diagrams illustrating the method of manufacturing the diffractive optical element according to the first embodiment.
Figure 3B:
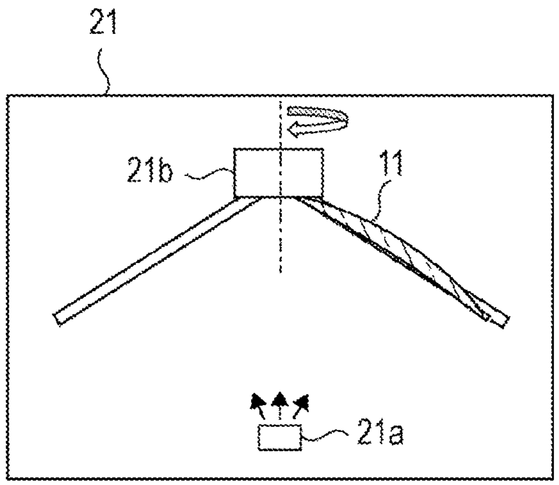
Figure 3C:
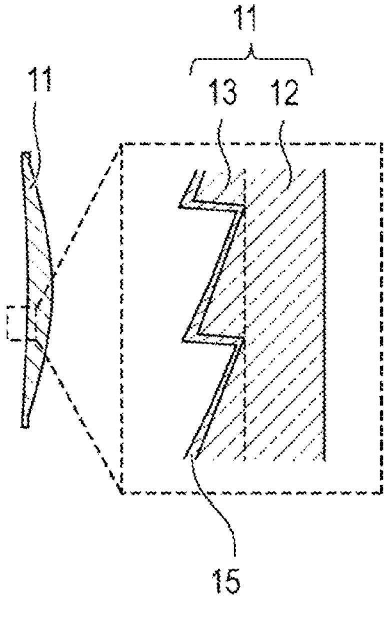
Figure 4A:
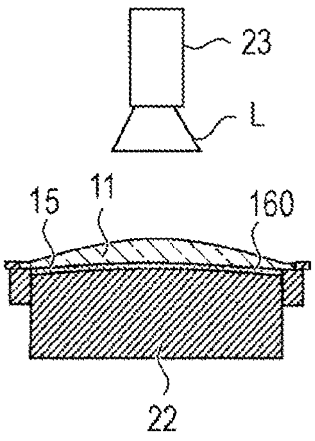
FIGS. 4A and 4B are schematic diagrams illustrating the method of manufacturing the diffractive optical element according to the first embodiment.
Figure 4B:
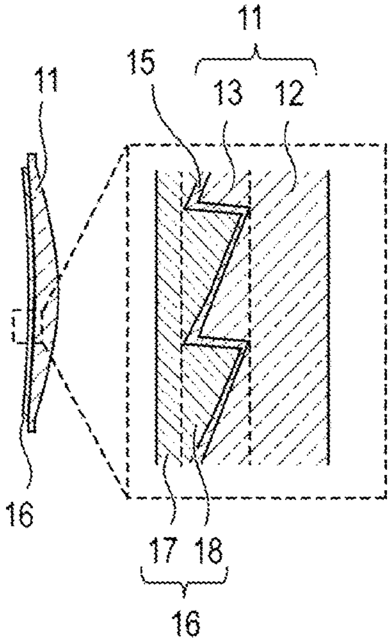

Next, a method of manufacturing the diffractive optical element 10 according to the present embodiment will be described with reference to FIGS. 2A to 4B. FIGS. 2A to 4B are schematic diagrams illustrating the method of manufacturing the diffractive optical element 10 according to the present embodiment. FIG. 2A illustrates a cross section of an injection mold 20 for injection molding the first resin portion 11 on the left side, and an enlarged part surrounded by a rectangle of a broken line in the cross section on the right side. FIG. 2B illustrates a cross section of the first resin portion 11 after the injection molding on the left side, and an enlarged part surrounded by a rectangle of a broken line in the cross section on the right side. FIGS. 3A and 3B are sectional views illustrating a vacuum vapor deposition apparatus 21 for vapor-depositing the transparent inorganic film 15. FIG. 3C illustrates a cross section of the first resin portion 11 and the transparent inorganic film 15 after the deposition of the transparent inorganic film 15 on the left side, and an enlarged part surrounded by a rectangle of a broken line in the cross section on the right side. FIG. 4A is a cross sectional view illustrating a mold 22 for molding the second resin portion 16. FIG. 4B illustrates a cross section of the first resin portion 11, the transparent inorganic film 15 and the second resin portion 16 after molding the second resin portion 16 on the left side, and an enlarged part surrounded by a rectangle of a broken line in the cross section on the right side.

First, as illustrated in FIG. 2A, the first resin material 110 to form the first resin portion 11 is molded by injection molding using the injection mold 20 having a diffraction grating shape 20*a* corresponding to the desired first diffraction grating 13*a*. Thus, as illustrated in FIG. 2B, the first resin portion 11 made of the cured first resin material 110 is formed. As the first resin material 110 used at this time, a thermoplastic resin for injection molding can be used and specifically, a thermoplastic resin such as polycarbonate (PC), polyester (PEs), or the like can be exemplified from the viewpoint of optical properties and moldability. Note that the method of forming the first resin portion 11 is not limited to injection molding, and other molding methods can be used.

Next, as illustrated in FIGS. 3A and 3B, the transparent inorganic film 15 made of a transparent inorganic material is formed by vacuum vapor deposition of the transparent inorganic material on the grating part 13 of the first resin portion 11 in the vacuum vapor deposition apparatus 21. The vacuum vapor deposition apparatus 21 has, inside, a vapor deposition source 21*a* that evaporates the transparent inorganic material and a support rotating part 21*b* that supports the first resin portion 11 so as to be able to make the first resin portion 11 revolve and rotate.

In the vacuum vapor deposition, first, as illustrated in FIG. 3A, the vacuum vapor deposition of the transparent inorganic film 15 is carried out while simultaneously making the first resin portion 11 revolve and rotate by the support rotating part 21*b* that holds the first resin portion 11 so as to tilt the grating part 13 toward the vapor deposition source 21*a*. Here, the rotation of the first resin portion 11 is a rotation of the first resin portion 11 with the optical axis of the diffractive optical element 10 that is the center of the first diffraction grating 13*a* as the rotation axis. The revolution of the first resin portion 11 is a rotation with a reference axis in the vacuum vapor deposition apparatus 21 as the rotation axis. Thus, a uniform transparent inorganic film 15 is formed on the entire surface of the grating part 13 of the first resin portion 11.

Subsequently, as illustrated in FIG. 3B, while the rotation of the first resin portion 11 by the support rotating part 21*b* is stopped, the vacuum vapor deposition of the transparent inorganic film 15 is performed while only the revolution of the first resin portion 11 is performed by the support rotating part 21*b*. Thus, the transparent inorganic film 15 at the grating tip of the first diffraction grating 13*a* in the grating part 13 is formed thicker.

In this way, as illustrated in FIG. 3C, the thickness of the transparent inorganic film 15 at the grating tip of the first diffraction grating 13*a* is made thicker than the thickness of the transparent inorganic film 15 on the grating surface other than the grating tip of the first diffraction grating 13*a*. Note that, as another method of forming the transparent inorganic film 15 having such different thicknesses, a method of vacuum vapor deposition of the transparent inorganic film 15 by arranging a mask covering other than the grating tip of the first diffraction grating 13*a* over the first diffraction grating 13*a* can be used. Note also that, as a method of forming the transparent inorganic film 15, various deposition methods such as sputtering can be used instead of vacuum vapor deposition.

Here, the transparent inorganic material to be vapor-deposited, that is, the transparent inorganic material constituting the transparent inorganic film 15, is not particularly limited and various materials can be used as the transparent inorganic material. From the viewpoint of optical properties, aluminum oxide ($Al_2O_3$), silicon oxide ($SiO_2$ or SO), titanium oxide ($TiO_x$), tantalum oxide ($TaO_x$), niobium oxide ($NbO_x$), or the like is preferably used as the transparent inorganic material. Note that these transparent inorganic materials can be used in one type alone or in a combination of multiple types.

The thickness of the transparent inorganic film 15 on the first resin portion 11 is preferably 10 nm or more. Since the thickness of the transparent inorganic film 15 is 10 nm or more, it is possible to effectively prevent the second resin material constituting the second resin portion 16 from permeating and dissolving into the first resin material constituting the first resin portion 11 other than at the grating tip. Since the thickness of the transparent inorganic film 15 is preferably 300 nm or less from the viewpoint described later, the thickness of the transparent inorganic film 15 is preferably 10 nm or more and 300 nm or less.

Further, the thickness of the transparent inorganic film 15 at the grating tip of the first diffraction grating 13*a* of the first resin portion 11 is preferably 1.2 times or more than the thickness at the grating surface other than the grating tip of the first diffraction grating 13*a*. Further, when the thickness of the transparent inorganic film 15 at the grating tip of the first diffraction grating 13*a* of the first resin portion 11 is d (nm (nanometer)) and the grating height of the first diffraction grating 13*a* is h (μm (micrometer)), the thickness d is preferably in the range represented by the following formula (1).

$$5 \times h + 45 \leq d \leq 300 \ldots \quad (1)$$

Note that, as illustrated in FIG. 1B, the grating height h of the first diffraction grating 13*a* is a height from the boundary between the grating base part 12 and the grating part 13 to the grating tip of the first diffraction grating 13*a*. Note also that, when the inclination angle of the grating surface of the first diffraction grating 13*a* is sufficiently small, the grating height h may also be the maximum length of the perpendicular line with respect to the grating surface from the grating surface to the boundary between the grating base part 12 and the grating part 13 at the convex part including the grating surface. Note also that the thickness d of the transparent inorganic film 15 at the grating tip of the first diffraction grating 13*a* is a thickness along the grating height h.

The higher the grating height becomes, the sparser the material filling tends to be at the time of the injection molding, and the lower the density of the grating tip in the first diffraction grating 13*a* of the first resin portion 11 tends to be. As a result, the higher the grating height becomes, the easier the second resin material of the second resin portion 16 tends to permeate and dissolve into the first resin material of the first resin portion 11. The formula (1) indicates that, in order to prevent such permeation and dissolution, the higher the grating height, the thicker the transparent inorganic film 15 at the grating tip of the first diffraction grating 13*a* should be. On the other hand, if the thickness of the transparent inorganic film 15 exceeds 300 nm, the transparent inorganic film 15 may crack due to temperature changes under the operating environment. Therefore, the thickness of the transparent inorganic film 15 is preferably 300 nm or less.

Further, in the first resin portion 11, the transparent inorganic film 15 may be formed so as to cover at least the optically effective region, which is a region where the first diffraction grating 13*a* is formed, and may not be formed in an optically ineffective region, which is a region other than the optically effective region. Specifically, the transparent inorganic film 15 may not be formed in the region inside, for example, 0.1 mm from the outer periphery of the grating part 13 and the outer peripheral part 14 in contact with the outer periphery of the grating part 13 as the optically ineffective region. In this case, the transparent inorganic film 15 can be prevented from being formed in the optically ineffective region by covering the optically ineffective region with a mask during vacuum vapor deposition of the transparent inorganic film 15. When the transparent inorganic film 15 is not formed in the optically ineffective region, the second resin material constituting the second resin portion 16 permeates and dissolves into the first resin material constituting the first resin portion 11, but there is an advantage in improving the adhesion between the first resin portion 11 and the second resin portion 16. In particular, when the transparent inorganic film 15 is not formed in the optically ineffective region in the grating part 13, the permeation and dissolution of the second resin material of the second resin portion 16 into the first resin material of the first resin portion 11 further occurs at the grating tip in the optically ineffective region, and as a result, the adhesion is further improved.

Next, as illustrated in FIG. 4A, the second resin material 160 to form the second resin portion 16 is molded on the first resin portion 11 on which the transparent inorganic film 15 is formed by using the mold 22 for forming the second resin portion 16. Thus, as illustrated in FIG. 4B, the second resin portion 16 made of the cured second resin material 160 is formed. The second resin material 160 used at this time is preferably a photocurable resin or a thermosetting resin. When a photocurable resin is used as the second resin material 160, a light source 23 irradiates the second resin material 160 between the mold 22 and the first resin portion 11 with light L such as ultraviolet rays for curing the second resin material 160. In particular, the photocurable resin is preferable in that the curing rate is high and the cost is excellent. Examples of the photocurable resin include acrylic-based, methacrylic-based, epoxy-based, thiol-based, and episulfide-based resins, and the like. In particular, episulfide-based resins are known to have high diffraction efficiency due to their refractive index characteristics, but on the other hand, it has been confirmed that episulfide-based resins have strong ability of the permeation and dissolution into the first resin material of the first resin portion 11. Even when the second resin portion 16 is formed by using an episulfide-based resin, according to the present embodiment, deterioration of the diffraction efficiency due to the permeation and dissolution of the resin material can be reduced or prevented while the influence of the transparent inorganic film 15 on the initial optical performance is minimally suppressed.

The diffractive optical element 10 can be manufactured by the above method. The diffractive optical element 10 manufactured by the above method can be evaluated by, for example, a change between an initial value of the diffraction efficiency in a desired wavelength region and a value after being left in a high temperature environment for the aged evaluation, as described below. At this time, the wavelength region for measuring the diffraction efficiency can be, for example, in the range of 420 nm to 700 nm, and the state of being left in the high temperature environment can be, for example, 60° C. for 1000 hours. When the change between the initial value of the diffraction efficiency and the value after being left in the high temperature environment is 2% or less, the optical performance is not greatly affected, and therefore the diffractive optical element 10 can be evaluated as being good.

Thus, according to the present embodiment, the high optical performance can be maintained while reducing or preventing the age-related deterioration of the diffractive optical element 10 in which the resin material is used for each of the first resin portion 11 and the second resin portion 16.

Example 1

A diffractive optical element and a method of manufacturing the diffractive optical element according to Example 1 will be described with reference to FIGS. 5A to 7B. FIGS. 5A to 7B are schematic diagrams illustrating the method of manufacturing the diffractive optical element 10 according to Example 1, which corresponds to FIGS. 2A to 4B, respectively.

Figure 5A:
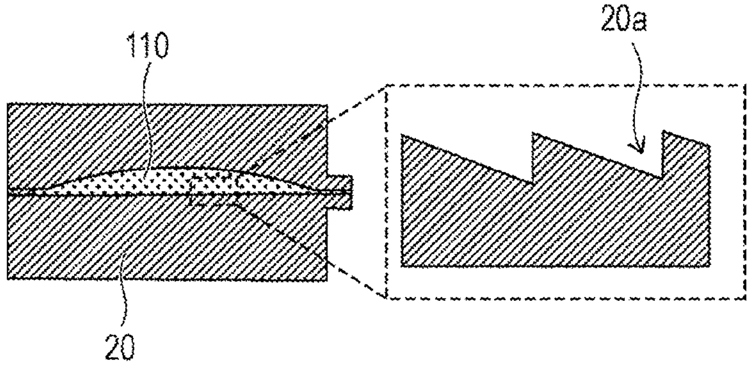
FIGS. 5A and 5B are schematic diagrams illustrating a method of manufacturing a diffractive optical element according to Example 1.
Figure 5B:
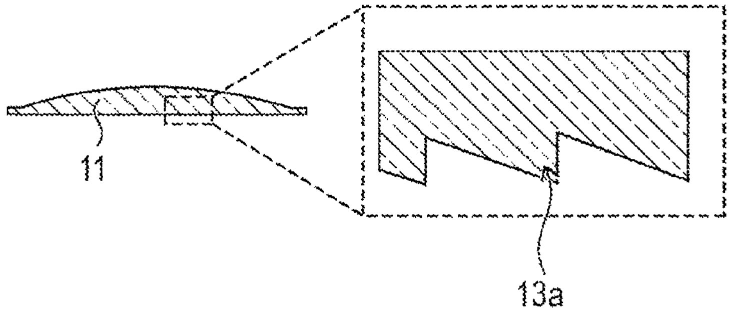

First, a polycarbonate-based resin material (EP4500, Mitsubishi Gas Chemical Co., Ltd.) was injection molded as the first resin material 110 using an injection mold 20 illustrated in FIG. 5A, and the first resin portion 11 was formed as illustrated in FIG. 5B. The first resin portion 11 had an outer diameter of ϕ 45 mm and a central thickness of 5 mm, and had optical surfaces on both sides, one surface of which had a convex shape and the other surface of which was a flat surface and formed with the first diffraction grating 13*a* having a grating height of 10 μm. The first diffraction grating 13*a* was arranged concentrically with respect to the center of the outer diameter, and the grating spacing decreased from the center toward the outer periphery, and the first grating width counted from the center was 2 mm, while the grating width of the outermost periphery was 0.02 mm. Further, the first resin portion 11 was provided with the flat outer peripheral part 14 having a width of 2.5 mm and a thickness of 2 mm in contact with the outer peripheries of the optical surfaces.

Figure 6A:
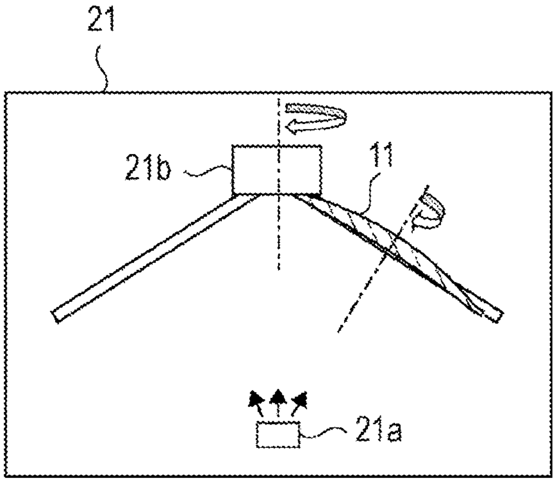
FIGS. 6A, 6B and 6C are schematic diagrams illustrating the method of manufacturing the diffractive optical element according to Example 1.
Figure 6B:
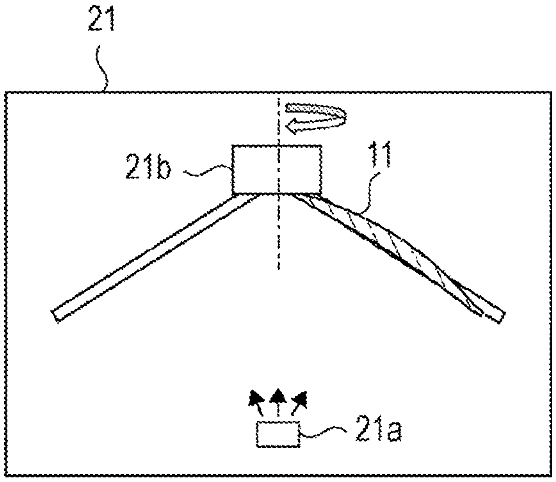
Figure 6C:
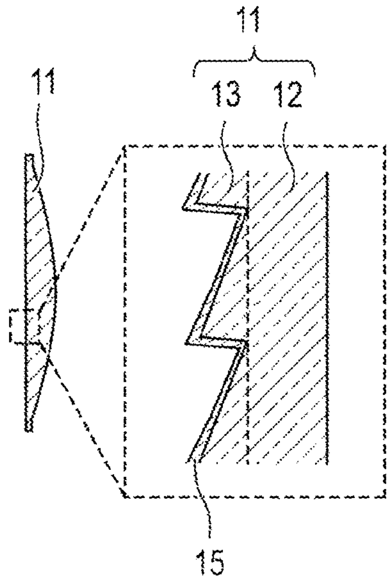

Next, as illustrated in FIGS. 6A to 6C, the transparent inorganic film 15 made of a transparent inorganic material was deposited on the grating part 13 of the first resin portion 11 by the vacuum vapor deposition in the vacuum vapor deposition apparatus 21. Silicon oxide ($SiO_2$) was used as the transparent inorganic material. First, as illustrated in FIG. 6A, the vacuum vapor deposition of the transparent inorganic film 15 was carried out while simultaneously rotating and revolving the first resin portion 11 by the support rotating part 21*b* holding the first resin portion 11 so as to tilt the grating part 13 toward the vapor deposition source 21*a*. The rotation and revolution of the first resin portion 11 were as described above. Subsequently, as illustrated in FIG. 6B, while the rotation of the first resin portion 11 by the support rotating part 21*b* was stopped, the vacuum vapor deposition of the transparent inorganic film 15 was carried out while only the revolution of the first resin portion 11 was carried out by the support rotating part 21*b*. As a result, in the formed transparent inorganic film 15, the thickness of the transparent inorganic film 15 at the grating tip of the first diffraction grating 13*a* was 100 nm, and the average thickness of the grating surface other than the grating tip of the first diffraction grating 13*a* was 30 nm. At this time, the width of the tip part including the grating tip was set to 0.02 mm at the first diffraction grating 13*a* near the center. The width of the tip part was set to 0.01 mm as the width of a region which is 50% or less of the grating width in the first diffraction grating 13*a* near the outer periphery in the present example.

Figure 7A:
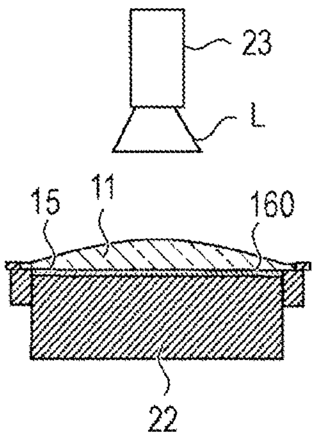
FIGS. 7A and 7B are schematic diagrams illustrating the method of manufacturing the diffractive optical element according to Example 1.
Figure 7B:
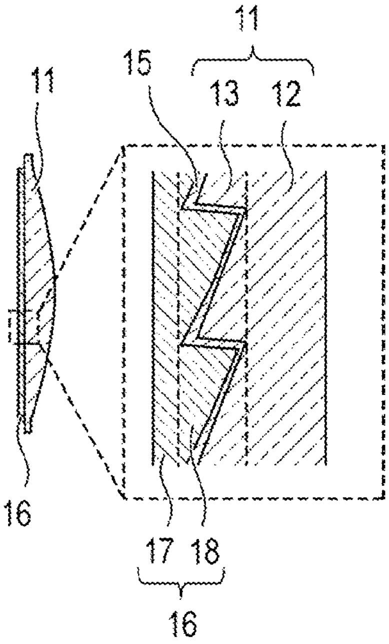

Next, as illustrated in FIG. 7A, the second resin material 160 serving as the second resin portion 16 was molded on the first resin portion 11 formed with the transparent inorganic film 15 by using the mold 22 for molding the second resin portion 16. Thus, as illustrated in FIG. 7B, the second resin portion 16 made of the cured second resin material 160 was formed. As the second resin material 160 used at this time, an episulfide-based resin material (LPS-H2) which is a photocurable resin was used. The mold 22 had a flat shape of ϕ 48 mm.

In the molding of the second resin material 160, the second resin material 160 was filled between the mold 22 and the grating part 13 formed with the transparent inorganic film 15 of the first resin portion 11 so that the thickness of the grating base part 17 of the second resin portion 16 was 100 μm. At this time, the peripheral edge of the filled region of the second resin material 160 was set to be larger than the outer diameter of the grating part 13 of the first resin portion 11, ϕ 45 mm, up to the outer peripheral part, ϕ 48 mm, of the mold 22 so that the filled region could fit between $46 mm and ϕ 47 mm as much as possible. After filling the second resin material 160 between the mold 22 and the grating part 13, the second resin material 160 was irradiated with light, and the second resin material 160 was cured to form the second resin portion 16. Thereafter, the second resin portion 16 was separated from the mold 22 as an integral part with the first resin portion 11 to manufacture the diffractive optical element 10 according to the present example.

The diffractive optical element 10 according to the present example thus manufactured was evaluated by the change between the initial value of the diffraction efficiency in the wavelength range from 420 nm to 700 nm and the value after being left in a high temperature environment as an evaluation substitute for the aging evaluation. The state of being left in the high temperature environment was 60° C. for 1000 hours. When the change between the initial value of the diffraction efficiency and the value after the left in a high temperature environment was 2% or less, the optical performance was not greatly affected, and it was evaluated as good. As a result, as shown in Table 1, it was confirmed that the diffraction efficiency of the diffractive optical element 10 according to the present example was good.

Example 2

In the present example, the conditions of the step of forming the transparent inorganic film 15 on the grating part 13 of the first resin portion 11 of Example 1 by the vacuum vapor deposition were changed. Thus, in the present example, in the transparent inorganic film 15, the thickness at the grating tip of the first diffraction grating 13*a* was set to 300 nm, and the average thickness at the grating surface other than the grating tip of the first diffraction grating 13*a* was set to 100 nm. Except for these points, the diffractive optical element 10 was manufactured in the same manner as in Example 1.

The diffractive optical element 10 according to the present example manufactured in this manner was also evaluated by the change in the diffraction efficiency as evaluated in Example 1. As a result, as shown in Table 1, it was confirmed that the diffractive optical element 10 according to the present example had good diffraction efficiency.

Example 3

In the present example, the grating height of the first diffraction grating 13*a* in the grating part 13 of the first resin portion 11 of Example 1 was set to 1 μm, and the conditions of the step of forming the transparent inorganic film 15 by the vacuum vapor deposition were changed. Thus, in the present example, in the transparent inorganic film 15, the thickness at the grating tip of the first diffraction grating 13*a* was set to 50 nm, and the average thickness at the grating surface other than the grating tip of the first diffraction grating 13*a* was set to 20 nm. Except for these points, the diffractive optical element 10 was manufactured in the same manner as in Example 1.

The diffractive optical element 10 according to the present example manufactured in this manner was also evaluated by the change in the diffraction efficiency as evaluated in Example 1. As a result, as shown in Table 1, it was confirmed that the diffractive optical element 10 according to the present example had good diffraction efficiency.

Example 4

In the present example, the grating height of the first diffraction grating 13*a* in the grating part 13 of the first resin portion 11 of Example 1 was set to 15 μm, and the conditions of the step of forming the transparent inorganic film 15 by the vacuum vapor deposition were changed. Thus, in the present example, in the transparent inorganic film 15, the thickness at the grating tip of the first diffraction grating 13*a* was set to 120 nm, and the average thickness at the grating surface other than the grating tip of the first diffraction grating 13*a* was set to 100 nm. Except for these points, the diffractive optical element 10 was manufactured in the same manner as in Example 1.

The diffractive optical element 10 according to the present example manufactured in this manner was also evaluated by the change in the diffraction efficiency as evaluated in Example 1. As a result, as shown in Table 1, it was confirmed that the diffractive optical element 10 according to the present example has good diffraction efficiency.

Example 5

In the present example, when the transparent inorganic film 15 of Example 1 is deposited by the vacuum vapor deposition, the vacuum vapor deposition was carried out in a state in which a mask was applied to a region outside of $45.8 mm, which was the optically ineffective region. Thus, in the present example, the transparent inorganic film 15 was not formed in the 0.1 mm inside from the outside of the grating part 13 of the first resin portion 11 and in the outer peripheral part 14. Except for these points, the diffractive optical element 10 was manufactured in the same manner as in Example 1.

The diffractive optical element 10 according to the present example manufactured in this manner was also evaluated by the change in the diffraction efficiency as evaluated in Example 1. As a result, as shown in Table 1, it was confirmed that the diffractive optical element 10 according to the present example has good diffraction efficiency.

TABLE 1

| | | Example 1 | Example 2 | Example 3 | Example 4 | Example 5 | Comparative example 1 | Comparative example 2 |
|---|---|---|---|---|---|---|---|---|
| Grating height | | 10 μm | 10 μm | 1 μm | 15 μm | 10 μm | 10 μm | 10 μm |
| Thickness of transparent inorganic film | Grating tip | 100 nm | 300 nm | 50 nm | 120 nm | 100 nm | 50 nm | 80 nm |
| | Grating surface other than grating tip | 30 nm | 100 nm | 20 nm | 100 nm | 30 nm | 50 nm | 100 nm |
| Region of transparent inorganic film | | ϕ 50 mm | ϕ 50 mm | ϕ 50 mm | ϕ 50 mm | ϕ 45.8 mm | ϕ 50 mm | ϕ 50 mm |
| Diffraction efficiency | | Good | Good | Good | Good | Good | Deteriorated | Deteriorated |

Comparative Example 1

In the present comparative example, the conditions of the step of forming the transparent inorganic film 15 on the grating part 13 of the first resin portion 11 of Example 1 by the vacuum vapor deposition were changed, and only the rotation and the revolution of the first resin portion 11 were performed simultaneously during the vacuum vapor deposition. Thus, in the present comparative example, in the transparent inorganic film 15, the thickness at the grating tip of the first diffraction grating 13*a* was set to 50 nm, and the average thickness at the grating surface other than the grating tip of the first diffraction grating 13*a* was set to 50 nm, which were made uniform. Except for these points, the diffractive optical element was manufactured in the same manner as in Example 1.

The diffractive optical element according to the present comparative example manufactured in this manner was also evaluated by the change in the diffraction efficiency as evaluated in Example 1. As a result, as shown in Table 1, it was confirmed that the diffraction efficiency of the diffractive optical element according to the present comparative example was deteriorated.

Comparative Example 2

In the present comparative example, the conditions of the step of forming the transparent inorganic film 15 on the grating part 13 of the first resin portion 11 of Example 1 by the vacuum vapor deposition were changed. Under the changed conditions, the first resin portion 11 was rotated and revolved simultaneously during the vacuum vapor deposition, and the tip of the first diffraction grating 13*a* in the grating part 13 of the first resin portion 11 was masked, and the transparent inorganic film 15 was deposited by the vacuum vapor deposition while the first resin portion 11 was rotated and revolved simultaneously. Thus, in the present comparative example, in the transparent inorganic film 15, the thickness at the grating tip of the first diffraction grating 13*a* was set to 80 nm, and the average thickness at the grating surface other than the grating tip of the first diffraction grating 13*a* was set to 100 nm. Except for these points, the diffractive optical element was manufactured in the same manner as in Example 1.

The diffractive optical element according to this comparative example manufactured in this manner was also evaluated by the change in the diffraction efficiency as evaluated in Example 1. As a result, as shown in Table 1, it was confirmed that the diffraction efficiency of the diffractive optical element according to the present comparative example was deteriorated.

Second Embodiment

The diffractive optical element 10 according to the first embodiment described above can be applied to a variety of equipment and devices such as optical apparatuses, display apparatuses, imaging apparatuses, and the like. In the present embodiment, an optical apparatus, a display apparatus, and an imaging apparatus will be described as specific application examples of the diffractive optical element 10 according to the first embodiment.

(Optical Apparatus)

Specific application examples of the diffractive optical element 10 according to the first embodiment include a lens constituting an optical apparatus (imaging optical system) for a camera or video camera, a lens constituting an optical apparatus (projection optical system) for a liquid crystal projector, and the like. It can also be used for a pickup lens such as a DVD recorder. These optical systems include at least one lens arranged in the housing, and the diffractive optical element 10 according to the first embodiment can be used for the at least one lens.

(Display Apparatus)

Figure 8A:
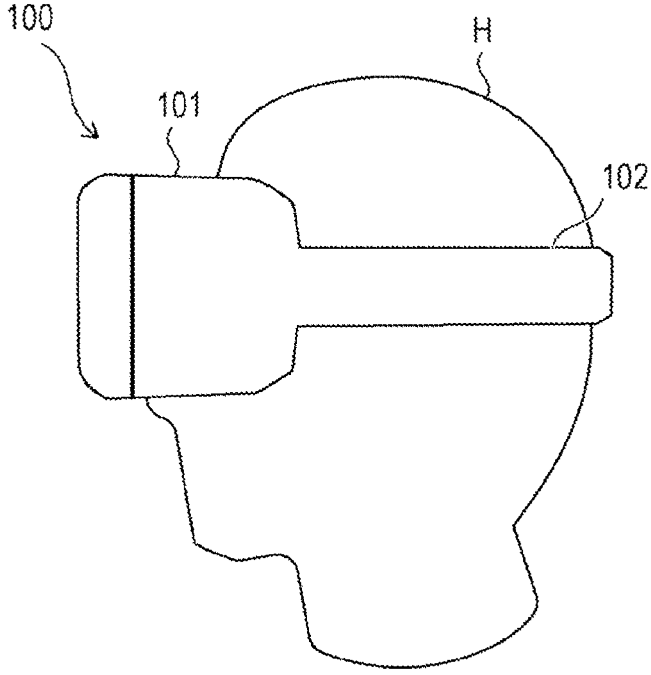
FIGS. 8A, 8B and 8C are schematic diagrams illustrating a display apparatus according to a second embodiment of the present disclosure.
Figure 8B:
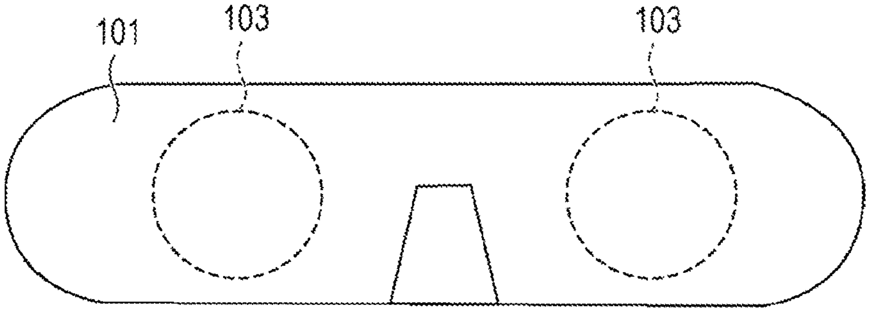
Figure 8C:
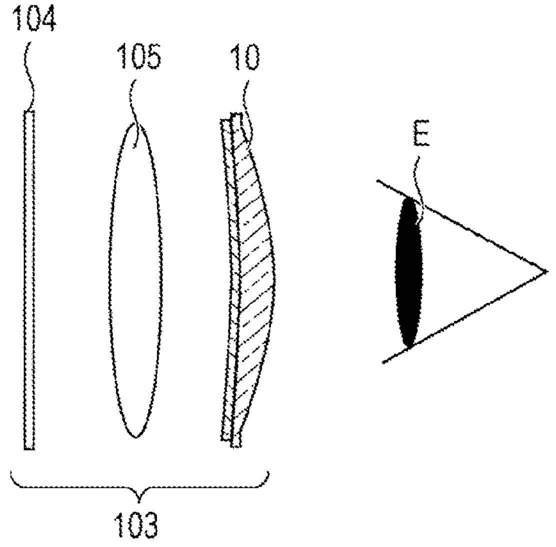

FIGS. 8A to 8C are schematic diagrams illustrating a configuration of a head mounted display (HMD) 100, which is an example of a preferred embodiment of a display apparatus using the diffractive optical element 10 according to the first embodiment. FIG. 8A is a side view illustrating the HMD 100. FIG. 8B is a front view illustrating the HMD 100. FIG. 8C is a schematic diagram illustrating the optical system of the HMD 100.

As illustrated in FIGS. 8A and 8B, the HMD 100 includes a housing 101, a mounting component 102, and display units 103 for the left and right eyes. Each display unit 103 is provided in the housing 101. The HMD 100 is mounted on the head H of a user by the mounting component 102 so that the display units 103 for the left eye and the right eye are positioned corresponding to the left eye and the right eye of the user, respectively.

As illustrated in FIG. 8C, each display unit 103 includes a display panel 104, an optical system 105, and the diffractive optical element 10 according to the first embodiment. The display panel 104 may be a display unit of an organic electroluminescence (EL) panel, a liquid crystal panel, or the like, and displays a corresponding image for the left eye or the right eye. The optical system 105 forms an image light emitted from the display panel 104 at the position of the eye E of the user. Depending on the design of the HMD 100, the optical system 105 may include a transmission optical element such as a convex lens or a concave lens, a reflection optical element such as a concave mirror, an optical path changing element such as a mirror or a polarization beam splitter (PBS), and the like. The diffractive optical element 10 is arranged between the optical system 105 and the eye E to correct the chromatic aberration of the image light emitted from the optical system 105 and formed on the eye E through the diffractive optical element 10. The diffractive optical element 10, together with the optical system 105, constitutes an optical system for guiding the image light which is the light emitted from the display panel 104 to the eye E of the user, and functions as at least one of the lenses in the optical system.

Note that, although the display apparatus has been described using the HMD here, the diffractive optical element 10 can also be used for a projector and the like in the same manner.

(Imaging Apparatus)

Figure 9:
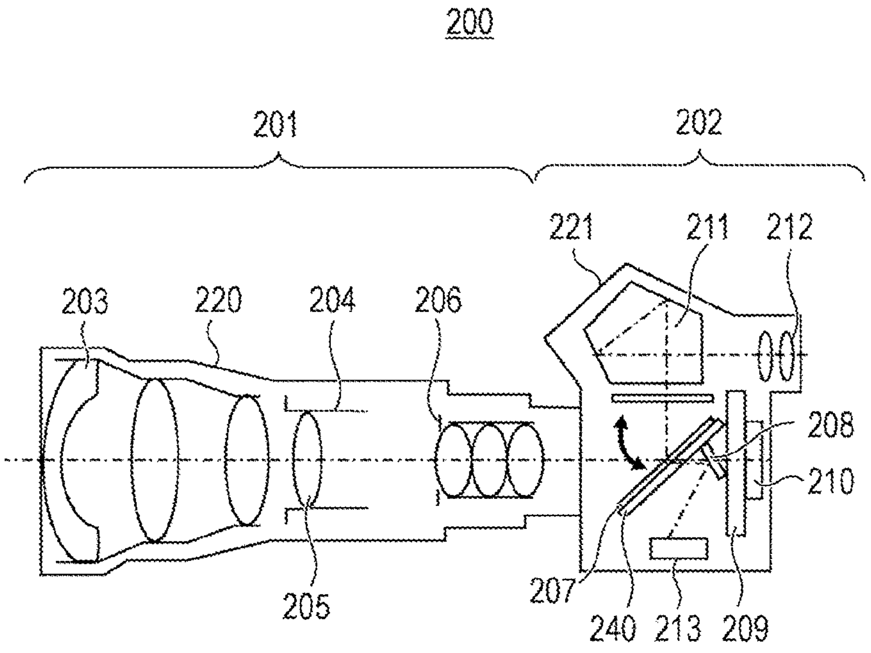
FIG. 9 is a schematic diagram illustrating an imaging apparatus according to the second embodiment.

FIG. 9 is a schematic diagram illustrating a configuration of a single lens reflex digital camera 200, which is an example of a preferred embodiment of an imaging apparatus using the diffractive optical element 10 according to the first embodiment. In FIG. 9, a camera main body 202 and a lens barrel 201 which is an optical apparatus are coupled, and the lens barrel 201 is a so-called interchangeable lens which is attachable to and detachable from the camera main body 202.

Light from the subject is photographed through an optical system including a plurality of lenses 203 and 205 and the like arranged on the optical axis of the photographing optical system in the housing 220 of the lens barrel 201. The diffractive optical element 10 according to the first embodiment can be used for the lenses 203 and 205, for example. Here, the lens 205 is supported by an inner cylinder 204 and movably supported with respect to the outer cylinder of the lens barrel 201 for focusing and zooming.

In the observation period before photographing, light from the subject is reflected by a main mirror 207 in the housing 221 of the camera body, transmitted through a prism 211, and the photographed image is projected to a photographer through a finder lens 212. The main mirror 207 is, for example, a half mirror, and the light transmitted through the main mirror 207 is reflected by a sub-mirror 208 in the direction of an AF (autofocus) unit 213, and the reflected light is, for example, used for distance measurement. The main mirror 207 is attached to and supported by a main mirror holder 240 by adhesion or the like. During the photographing, the main mirror 207 and the sub-mirror 208 are moved out of the optical path through a driving mechanism (not illustrated), the shutter 209 is opened, and the imaging element 210 receives light entering from the lens barrel 201 and passing through the photographing optical system to form a photographed optical image. A diaphragm 206 is configured to change the brightness and the focal depth during the photographing by changing the aperture area.

Note that, although the image pickup device has been described by using a single-lens reflex digital camera, the diffractive optical element 10 can also be used for a smartphone, a compact digital camera, a drone, and the like in the same manner.

According to the present disclosure, the high optical performance can be maintained while the aging deterioration of the diffractive optical element using a resin material is reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-009972, filed Jan. 26, 2023, which is hereby incorporated by reference herein in its entirety.

What is claimed is:

1. A diffractive optical element comprising:

a first resin portion having a first diffraction grating and made of a first resin material;

a second resin portion having a second diffraction grating formed to cover the first diffraction grating and made of a second resin material; and a transparent inorganic film formed on an optically effective surface, which is an interface between the first diffraction grating and the second diffraction grating, wherein a thickness of the transparent inorganic film at a grating tip of the first diffraction grating, taken along a grating height of the first diffraction grating, is thicker than a thickness of the transparent inorganic film at a grating surface other than the grating tip of the first diffraction grating, taken in a normal direction to the grating surface.

2. The diffractive optical element according to claim 1, wherein the thickness of the transparent inorganic film at the grating tip of the first diffraction grating is at least 1.2 times thicker than the thickness of the transparent inorganic film at the grating surface other than the grating tip of the first diffraction grating.

3. The diffractive optical element according to claim 1, wherein, when the thickness of the transparent inorganic film at the grating tip of the first diffraction grating is d (nm) and a grating height of the first diffraction grating is h (μm), the thickness d and the grating height h satisfy the following equation (1):

$$5 \times h + 45 \leq d \leq 300. \tag{1}$$

4. The diffractive optical element according to claim 1, wherein the second resin material includes an episulfide-based resin.

5. The diffractive optical element according to claim 1, wherein the thickness of the transparent inorganic film is 10 nm or more and 300 nm or less.

6. The diffractive optical element according to claim 1, wherein the first resin portion has a grating part in which the first diffraction grating is formed and an outer peripheral part formed around a periphery of the grating part, and wherein the transparent inorganic film is not formed in the outer peripheral part.

7. The diffractive optical element according to claim 1, wherein the first resin material includes a thermoplastic resin.

8. The diffractive optical element according to claim 7, wherein the first resin portion is formed by injection molding.

9. An optical apparatus comprising a housing and an optical system having at least one lens arranged within the housing, wherein the at least one lens is the diffractive optical element according to claim 1.

10. A display apparatus comprising a housing, an optical system having at least one lens arranged within the housing, and a display unit that emits light to be guided by the optical system, wherein the at least one lens is the diffractive optical element according to claim 1.

11. An imaging apparatus comprising a housing, an optical system having at least one lens arranged within the housing, and an imaging element that receives light that has passed through the optical system, wherein the at least one lens is the diffractive optical element according to claim 1.

12. A method of manufacturing a diffractive optical element, comprising:

injection molding a thermoplastic resin to form a first resin portion having a first diffraction grating and made of the thermoplastic resin;

forming a transparent inorganic film on the first diffraction grating; and forming a photocurable resin on the transparent inorganic film to form a second resin portion having a second diffraction grating and made of the photocurable resin, wherein forming the transparent inorganic film forms the transparent inorganic film such that a thickness of the transparent inorganic film at a grating tip of the first diffraction grating, taken along a grating height of the first diffraction grating, is thicker than a thickness of the transparent inorganic film at a grating surface other than the grating tip of the first diffraction grating, taken in a normal direction to the grating surface.

13. The method according to claim 12, wherein forming the transparent inorganic film vapor-deposits the transparent inorganic film while performing rotation and revolution of the first resin portion, and then vapor-deposits the transparent inorganic film while performing the revolution of the first resin portion with the rotation stopped.

* * * * *